Nov. 17, 1959 R. W. GUINN 2,913,546
STORM WARNING SYSTEM
Filed Oct. 25, 1957 3 Sheets-Sheet 1
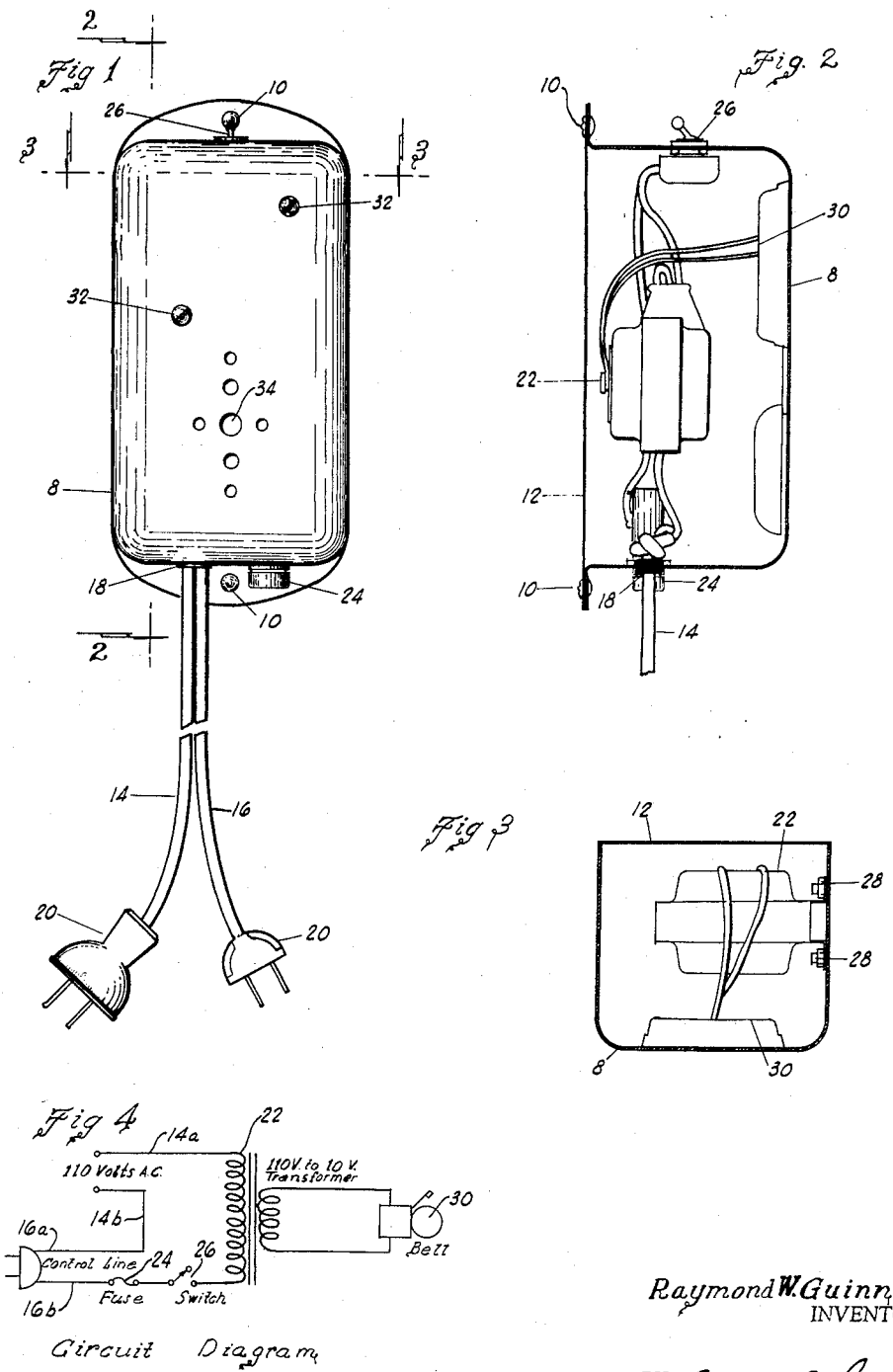
Raymond W. Guinn,
INVENTOR.
BY Jerry J Dunlap
ATTORNEY

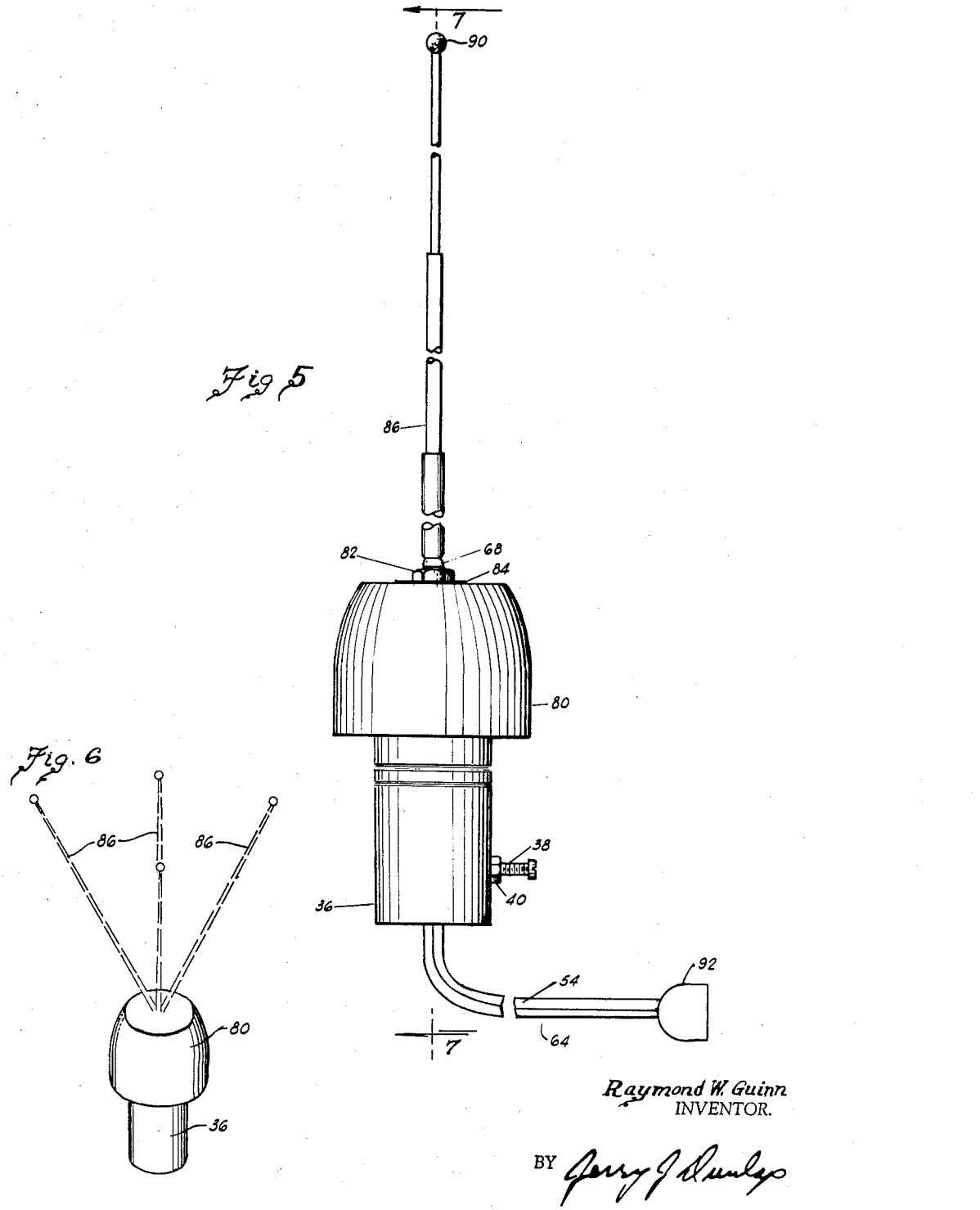

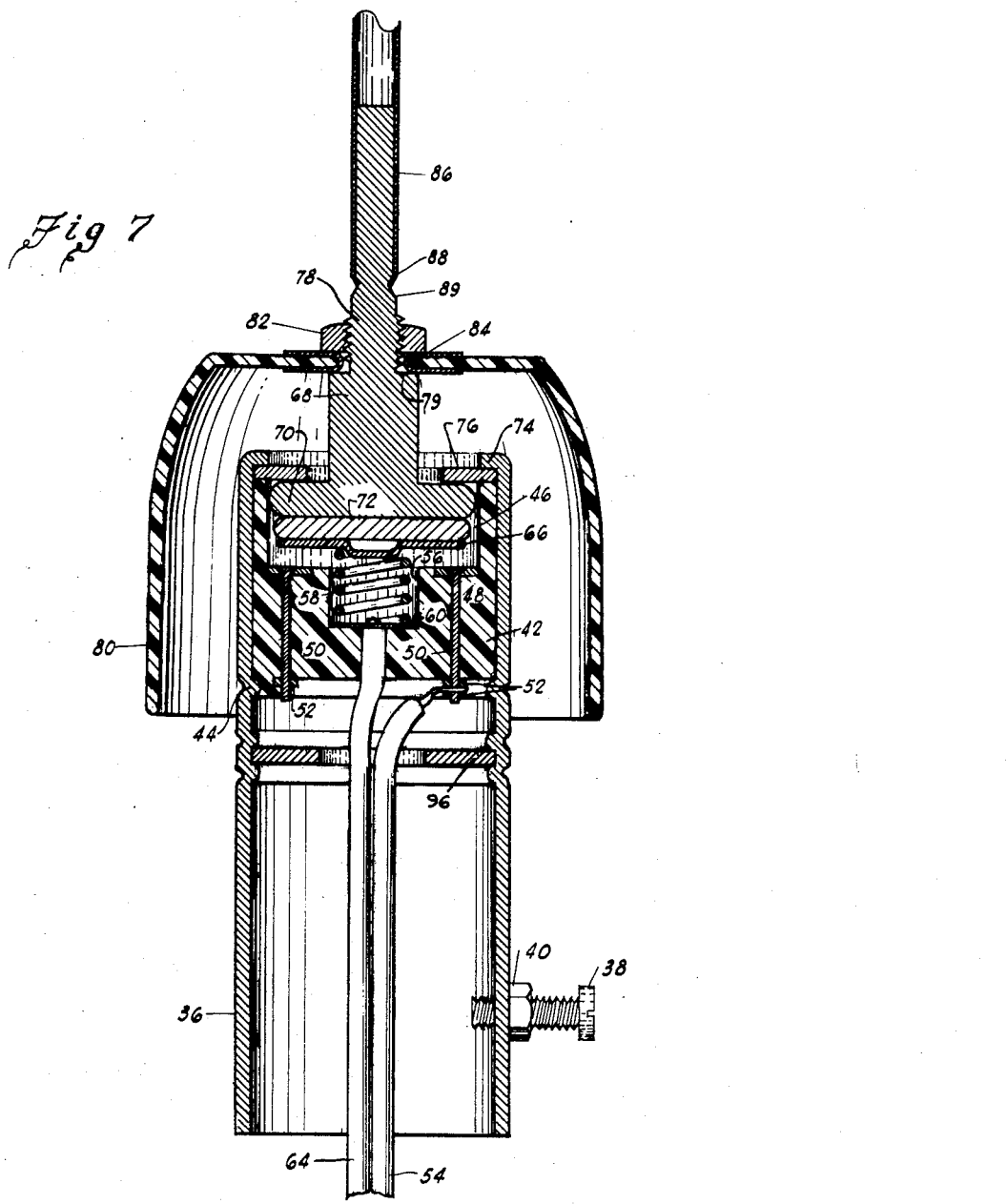

This invention relates to an improved system for signaling the approach of storms accompanied by high winds.

At the present time most people rely upon the information supplied by the weather bureau and other similar agencies to learn of the approach and impending danger of storms, particularly storms of the type accompanied by high winds. As it is well known in the art, the information received from such agencies is based on information obtained from widely scattered observation points, and a reliable prediction for localized areas, such as inland lakes, small boat docks, small air ports, isolated industrial areas and private homes usually cannot be obtained.

Previous attempts in the art to provide localized warnings of approaching storms have relied almost solely upon a change in barometric pressure preceding the storm. Actually, devices operated by changes in barometric pressure can only be effective to warn of the approach of a limited number of types of storms or severe weather conditions and are not generally applicable. Furthermore, such devices must be extremely sensitive to changes in barometric pressure in order to be effective, and, as a result, they frequently provide false warnings.

The present invention contemplates a novel storm warning system which is actuated when the wind velocity reaches a predetermined maximum. I utilize a yieldably supported elongated rod exposed to the wind in such a manner that at a certain velocity, the wind pivots or tilts the rod against the action of the means supporting the rod and actuates a signal, preferably an audible signal. The rod may be of any desired length and the supporting means for the rod may be of any desired strength to provide a warning when the wind velocity reaches any desired maximum.

An important object of this invention is to provide a storm warning system which will signal when the wind velocity reaches a predetermined maximum.

Another object of this invention is to provide a storm warning system which may be energized from a readily available electrical power source, but which will not utilize such power until actuated by a high wind.

A further object of this invention is to provide a compact and simply constructed storm warning system which may be economically manufactured.

Another object of this invention is to provide a storm warning system which will not be rendered inoperative by being exposed to weather conditions over extended periods of time.

A still further object of this invention is to provide a reliable system which will warn of an approaching storm, and which will give a minimum of false warnings.

Other objects and advantages of the invention will be evident from the following detailed description, when read in conjunction with the accompanying drawings which illustrate my invention.

In the drawings:

Figure 1 is an elevational view of the alarm portion of a warning system constructed in accordance with this invention.

Figure 2 is a sectional view as taken along lines 2—2 of Fig. 1.

Figure 3 is another sectional view as taken along lines 3—3 of Fig. 1.

Figure 4 is a circuit diagram of the alarm portion of a system constructed in accordance with the present invention.

Figure 5 is an elevational view of the actuating portion of one form of my novel system.

Figure 6 is a perspective view illustrating the movement of the actuating rod.

Figure 7 is a vertical sectional view as taken along lines 7—7 of Fig. 5.

Referring to the drawings in detail, and particularly Figs. 1 and 2, reference character 8 designates a housing or box which may be secured to a wall or the like (not shown) in an easily accessible location by means of screws 10 at the upper and lower ends of the box. As shown in Fig. 2, the wall side of the box is open, but is preferably covered during operation by a paper cover or the like 12 to prevent the entrance of dirt and dust into the box. A pair of cords 14 and 16 extend from the lower end of the box 8 through a suitable rubber grommet 18 in a manner well known in the art.

Each of the cords 14 and 16 contains two conductors, and each has a plug 20 on the outer end thereof to facilitate connection of the conductors to a power source and the actuating portion of the system, as will be more fully hereinafter set forth. As shown in Figs. 2 and 4, one conductor 14a of the cord 14 is connected to one side of the primary of a transformer 22 within the box 8. The other conductor 14b of the cord 14 is connected to one of the conductors 16a of the cord 16. The opposite conductor 16b of the cord 16 is connected in series through a fuse 24 and switch 26 to the opposite side of the primary of the transformer 22. The fuse 24 may be easily secured in the lower portion of the box 8, as illustrated in Figs. 1 and 2, and the switch 26 is preferably secured in the upper portion of the box 8 in such a manner that the handle of the switch protrudes above the box for convenient manual operation. The transformer 22 may be secured in the central portion of the box 8 by suitable screws 28 as illustrated in Fig. 3.

The secondary of the transformer 22 is connected in series with a bell 30 as illustrated in Fig. 4 to energize the bell upon the flow of current through the primary of the transformer. The bell 30 is preferably secured in the box 8 by suitable screws 32 to provide a compact unit and reduce the wiring required. The box 8 may be formed of any suitable material and, if desired, may have a series of apertures 34 in the outer face thereof opposite the bell 30 to facilitate the transmission of sound from the bell.

As best shown in Fig. 7, the actuating portion of my system comprises a tubular shaped housing 36 of a size to be telescoped over the upper end of a pole or the like (not shown). A set screw 38 extends through a nut 40 in one side of the housing 36 near the lower end of the housing to conveniently secure the housing 36 on the pole.

A block 42 of any suitable type of insulating material, such as plastic, is supported in the upper portion of the housing 36 on a circumferential flange 44 which may be easily formed by crimping in the walls of the housing. The insulating block 42 is provided with a cylindrically shaped chamber 46 in its upper end and has an annular shaped contact plate 48 disposed in the lower end of the chamber. The contact plate 48 is secured in a complementary groove in the lower end of the chamber 46 by means of a pair of bolts 50 extending vertically through complementary bores in the block. The bolts 50 are threaded at their lower ends to receive nuts 52 and hold the contact plate 48 in the position shown in Fig. 7. An insulated conductor 54 is secured to the lower end of one of the bolts 50 by an additional nut 52 and extends downwardly through the lower end of the housing 36 for purposes which will be hereinafter set forth.

A counter bore 56 is formed concentrically in the lower end of the chamber 46 of the insulating block 42 to receive a helical spring 58. The lower end of the spring 58 rests on a plate 60 of electrically conductive material, and the plate 60 is in turn connected to an insulated conductor 64 extending through a complementary bore in the block 42 and then on downwardly through the lower end of the housing 36. The spring 58 will, of course, be formed out of a metal which will transmit an electrical current, as will be more fully hereinafter set forth.

A circular shaped contact plate 66 is supported on the upper end of the spring 58, and the central portion of the plate 66 is preferably bent downwardly to extend into the upper end of the spring 58 for securing the plate on the spring. As will be observed, the plate 66 is of a size such that the lower outer edge thereof will engage the annular contact plate 48 when the plate 66 is tilted in any direction.

A plunger 68 extends downwardly into the upper end of the housing 36 and has a circumferential flange 70 formed on the lower end thereof. The flange 70 is supported on the circular contact plate 66 by means of a pad 72 of insulating material. The edges 74 of the upper end of the housing 36 are bent inwardly to retain a ring 76 between the edges 74 and the upper end of the insulating block 42. The retainer ring 76 is of a size to loosely receive the plunger 68 and yet extend inwardly over a portion of the upper face of the flange 70. The spring 58 is of a size to urge the plunger 68 upwardly and normally retain the flange 70 in contact with the retainer ring 76, whereby the plunger 68 is positioned in a vertical direction. However, the plunger 68 may be tilted in the retainer ring 76 in any direction to deflect one side of the spring 58 and lower the circular contact plate 66 into engagement with the annular contact plate 48.

A portion 78 of the plunger 68, a short distance above the housing 36, is reduced in diameter to form an upwardly facing shoulder 79 which supports a bell-shaped protective cover 80. The upper end of the cover 80 is apertured to permit telescoping of the cover over the upper end of the plunger 68, and the cover 80 is retained against the shoulder 79 by means of a threaded nut 82 engaging complementary threads on the reduced plunger portion 78. If the cover 80 is made of some material other than metal, such as plastic, it is desirable that a metal rim 84 be provided around the aperture through the cover to make contact with the nut 82 and shoulder 79 and prevent damage to the cover, as well as to facilitate a fluid tight connection between the cover and the plunger 68.

A tubular rod 86 is telescoped over the upper end of the plunger 68 and may easily be secured to the plunger by crimping the lower end 88 of the rod into a complementary groove 89 in the outer periphery of the plunger. As illustrated in Fig. 5, the rod 86 is preferably formed in telescoping sections to permit the selective lengthening and shortening of the rod. I prefer to secure a small ball 90 on the upper end of the upper most section of the rod 86 to facilitate telescoping and untelescoping of the rod, as well as to close the upper end of the rod.

The insulated conductors 54 and 64 are connected at their outer ends (see Fig. 5) to a suitable receptacle 92 of a size to receive the prongs of the plug 20 on the cord 16 shown in Fig. 1. Thus, the conductors 54 and 64 are connected in series with the conductors 16a and 16b to complete the circuitry of the system. It will then be observed that the contacts 48 and 66 form a switch in series with the transformer 22 to energize the transformer 22 and the bell 30 when both this switch and switch 26 are closed.

*Operation*

In installing my warning system, the housing 36 is secured on the top of a pole or the like in an exposed area outside of any enclosure. The housing 36 is merely telescoped over the upper end of the pole and is secured in a vertical position, as shown in Figs. 5 and 7, by tightening the set screw 38. If desired, a stop plate 94 (Fig. 7) may be secured in an intermediate portion of the housing 36 in any suitable manner to contact the upper end of the pole and limit the downward movement of the housing over the pole. The plate 94 is apertured to permit the passage of the conductors 54 and 64 therethrough.

The housing 8 of the alarm portion of the system is preferably installed in an area where the alarm will be heard by the occupants of a building. The distance between the alarm portion of the system and the actuator portion of the system is immaterial. The cord 16 and the conductors 54 and 64 may be extended as desired in order to connect the respective plug 20 in the receptacle 92 and complete the circuit through the system. The other plug 20 is inserted in a suitable power outlet, such as a wall receptacle of a household electric system as shown diagrammatically in Fig. 4. It will be apparent that the transformer 22 may be designed to step down the voltage of the power source to a voltage which will efficiently operate the bell 30.

In operation, the manual switch 26 is closed and retained closed at all times when it is desired that the system be in operation for warning of approaching storms. When the rod 86 is subjected to a high wind in any direction, the rod 86 and plunger 68 will be tilted or pivoted in the retainer ring 76 (as shown in Fig. 6) in the direction which the wind is blowing. It will be apparent that both the length of the rod 86 and the strength of the spring 58 will determine the wind velocity required to pivot the rod and plunger with respect to the housing 36. The spring 58 will normally have a given strength for each installation. However, the length of the rod 86 may be varied as desired by telescoping or untelescoping the various sections of the rod to provide a pivoting of the rod at any desired wind velocity. For example, when the rod 86 is fully extended, it may (in a typical design) be tilted by a wind of 35 m.p.h., and when fully telescoped, it may be tilted by a wind of 60 m.p.h. Thus, the owner of the system may position the rod 86 to provide pivoting of the rod at any desired wind velocity which would indicate to him that a storm was approaching his particular area.

When the rod 86 and plunger 68 are tilted or pivoted, the upper contact plate 66 is tilted into contact with some portion of the lower annular shaped contact plate 48. When this occurs, the circuit of the system is closed to provide operation of the bell 30. As the wind decreases in velocity, the spring 58 returns the flange 70 of the plunger 68 into contact with the retainer ring 76 to again position the rod 86 is a vertical direction and open the circuit of the system.

It will also be observed that the cover 80 extends over the upper end of the housing 36 in all positions of the rod 86 and plunger 68. Thus, the cover 80 will minimize the entrance of rain and dirt and other foreign matter into the upper end of the housing 36 where it would interfere with operation of the contacts 66 and 48.

From the foregoing it will be apparent that the present invention provides a novel warning system which will give a warning of any type of storm which is accompanied by high winds. Furthermore, the system will not be rendered inoperative by weather conditions or the entrance of foreign matter into the working parts of the system and the system may be set to provide an alarm at any desired wind velocity.

Changes may be made in the combination and arrangement of parts or elements heretofore set forth in the specification and shown in the drawings, it is being understood that changes may be made in the precise embodiment shown without departing from the spirit and scope of the invention as defined in the following claims.

I claim:

1. A signal actuator for use in a storm warning system having a signalling circuit, comprising a tubular housing, an insulating block secured in the housing, a helical spring anchored in the upper face of said block and extending toward the upper end of the housing, a conductor connected to said spring and extending through said insulating block for connection with the signalling circuit, a circular contact plate on the upper end of said spring, an annular contact plate on the upper face of said block extending around and out of contact with said spring, a conductor for connecting the annular contact plate to the signalling circuit, a retainer ring secured in the upper end of the housing above said spring, a wind responsive rod extending downwardly through the retainer ring, and a circumferential flange on the lower end of the rod wedged between the retainer ring and the circular contact plate to move the contact plates together upon bending of the rod in any direction.

2. A signal actuator as defined in claim 1 characterized further in that the rod is formed in telescopic sections for selectively lengthening and shortening the rod.

3. A signal actuator as defined in claim 1 characterized further in that the housing is tubular in configuration for mounting on the top of a pole or the like, and a bell-shaped guard is secured around the rod in a position to overhang the upper end of the housing and protect the contact plates from foreign matter.

References Cited in the file of this patent

UNITED STATES PATENTS

| | | |
|---|---|---|
| 2,658,967 | Matschke | Nov. 10, 1953 |
| 2,727,743 | Von Stoeser | Dec. 20, 1955 |
| 2,812,512 | Budde | Nov. 5, 1957 |